United States Patent
Krishnam et al.

(10) Patent No.: US 8,493,995 B2
(45) Date of Patent: Jul. 23, 2013

(54) MANAGING DISTRIBUTED ACCESS TO A SHARED MEDIUM

(75) Inventors: Manjunath Anandarama Krishnam, Gainesville, FL (US); Srinivas Katar, Gainesville, FL (US); Bradley Robert Lynch, Toronto (CA); Lawrence Winston Yonge, III, Summerfield, FL (US); Ehab Tahir, Mississauga (CA)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 12/118,613

(22) Filed: May 9, 2008

(65) Prior Publication Data

US 2008/0279126 A1 Nov. 13, 2008

Related U.S. Application Data

(60) Provisional application No. 60/917,232, filed on May 10, 2007.

(51) Int. Cl.
*H04L 12/43* (2006.01)
(52) U.S. Cl.
USPC .................................... 370/461; 709/226
(58) Field of Classification Search
None
See application file for complete search history.

(56) References Cited

U.S. PATENT DOCUMENTS

| | | | |
|---|---|---|---|
| 3,806,885 A | 4/1974 | Moore | |
| 4,569,044 A | 2/1986 | Tao et al. | |
| 4,581,734 A | 4/1986 | Olson et al. | |
| 4,630,261 A | 12/1986 | Irvin | |
| 4,677,612 A | 6/1987 | Olson et al. | |
| 4,682,324 A | 7/1987 | Ulug | |
| 4,720,850 A | 1/1988 | Oberlander et al. | |
| 4,726,018 A | 2/1988 | Bux et al. | |
| 4,792,947 A | 12/1988 | Takiyasu et al. | |
| 4,819,229 A | 4/1989 | Pritty et al. | |
| 4,881,241 A | 11/1989 | Pommier et al. | |
| 4,943,959 A | 7/1990 | Arnold | |
| 5,001,472 A | 3/1991 | Fischer et al. | |
| 5,003,539 A | 3/1991 | Takemoto et al. | |
| 5,046,069 A | 9/1991 | Calvignac et al. | |

(Continued)

FOREIGN PATENT DOCUMENTS

| | | |
|---|---|---|
| DE | 3413144 | 10/1985 |
| EP | 0818905 | 1/1998 |

(Continued)

OTHER PUBLICATIONS

Benedetto et al., "A Soft-Input Soft-Output Maximum A Posteriori (MAP) Module to Decode Parallel and Serial Concatenated Codes," TDA Progress Report 42-127, pp. 1-20 (Nov. 1996).
Bertsekas et al., Data Networks, Prentice Hall, Englewood Cliffs, NJ, Section 2.4.3 Selective Repeat ARQ (1992).
Blake, S. et al. "An Architecture for Differentiated Services," Network Working Group, IETF RFC 2475, Dec. 1998.

(Continued)

*Primary Examiner* — Yemane Mesfin
*Assistant Examiner* — Khoa Huynh
(74) *Attorney, Agent, or Firm* — DeLizio Gilliam, PLLC

(57) ABSTRACT

Communicating between stations in a network is described. A plurality of stations coordinate according to a distributed protocol to select a first station to transmit over a shared medium. The communication includes transmitting between the first station and a second station over the shared medium during a time period in which stations other than the first and second stations refrain from transmitting over the shared medium. The first station transmits information that grants permission to the second station to transmit during the time period.

55 Claims, 7 Drawing Sheets

U.S. PATENT DOCUMENTS

| | | |
|---|---|---|
| 5,081,678 A | 1/1992 | Kaufman et al. |
| 5,105,423 A | 4/1992 | Tanaka et al. |
| 5,121,396 A | 6/1992 | Irvin et al. |
| 5,140,584 A | 8/1992 | Suzuki |
| 5,157,659 A | 10/1992 | Schenkel |
| 5,197,061 A | 3/1993 | Halbert-Lassalle et al. |
| 5,214,646 A | 5/1993 | Yacoby |
| 5,228,025 A | 7/1993 | Le Floch et al. |
| 5,231,634 A | 7/1993 | Giles et al. |
| 5,274,629 A | 12/1993 | Helard et al. |
| 5,280,480 A | 1/1994 | Pitt et al. |
| 5,282,222 A | 1/1994 | Fattouche et al. |
| 5,307,376 A | 4/1994 | Castelain et al. |
| 5,339,313 A | 8/1994 | Ben-Michael et al. |
| 5,343,473 A | 8/1994 | Cidon et al. |
| 5,384,777 A | 1/1995 | Ahmadi et al. |
| 5,416,801 A | 5/1995 | Chouly et al. |
| 5,426,646 A | 6/1995 | Slack |
| RE35,001 E | 7/1995 | Grow |
| 5,432,848 A | 7/1995 | Butter et al. |
| 5,436,905 A | 7/1995 | Li et al. |
| 5,448,565 A | 9/1995 | Chang et al. |
| 5,452,288 A | 9/1995 | Rahuel et al. |
| 5,452,322 A | 9/1995 | Lauer |
| 5,473,602 A | 12/1995 | McKenna et al. |
| 5,481,535 A | 1/1996 | Hershey |
| 5,483,529 A | 1/1996 | Baggen et al. |
| 5,488,632 A | 1/1996 | Mason et al. |
| 5,504,747 A | 4/1996 | Sweazey |
| 5,515,379 A | 5/1996 | Crisler et al. |
| 5,524,027 A | 6/1996 | Huisken |
| 5,537,414 A | 7/1996 | Takiyasu et al. |
| 5,541,922 A | 7/1996 | Pyhalammi |
| 5,548,649 A | 8/1996 | Jacobson |
| 5,555,268 A | 9/1996 | Fattouche et al. |
| 5,563,883 A | 10/1996 | Cheng |
| 5,563,897 A | 10/1996 | Pyndiah et al. |
| 5,568,476 A | 10/1996 | Sherer et al. |
| 5,610,908 A | 3/1997 | Shelswell et al. |
| 5,612,975 A | 3/1997 | Becker et al. |
| 5,615,212 A | 3/1997 | Ruszczyk et al. |
| 5,619,651 A | 4/1997 | Young |
| 5,623,512 A | 4/1997 | Sasaki |
| 5,629,942 A | 5/1997 | Zijderhand |
| 5,629,948 A | 5/1997 | Hagiwara et al. |
| 5,636,230 A | 6/1997 | Marturano et al. |
| 5,644,576 A | 7/1997 | Bauchot et al. |
| 5,651,009 A | 7/1997 | Perreault et al. |
| 5,694,389 A | 12/1997 | Seki et al. |
| 5,706,348 A | 1/1998 | Gray et al. |
| 5,717,689 A | 2/1998 | Ayanoglu |
| 5,732,113 A | 3/1998 | Schmidl et al. |
| 5,737,330 A | 4/1998 | Fulthorp et al. |
| 5,745,769 A | 4/1998 | Choi |
| 5,757,766 A | 5/1998 | Sugita |
| 5,757,770 A | 5/1998 | Lagoutte et al. |
| 5,764,931 A | 6/1998 | Schmahl et al. |
| 5,771,235 A | 6/1998 | Tang et al. |
| 5,787,071 A | 7/1998 | Basso et al. |
| 5,790,541 A | 8/1998 | Patrick et al. |
| 5,793,307 A | 8/1998 | Perreault et al. |
| 5,793,861 A | 8/1998 | Haigh |
| 5,799,033 A | 8/1998 | Baggen |
| 5,812,599 A | 9/1998 | Van Kerckhove |
| 5,818,821 A | 10/1998 | Schurig |
| 5,818,826 A | 10/1998 | Gfeller et al. |
| 5,825,807 A | 10/1998 | Kumar |
| 5,828,677 A | 10/1998 | Sayeed et al. |
| 5,841,778 A * | 11/1998 | Shaffer et al. .................. 370/447 |
| 5,841,873 A | 11/1998 | Lockhart et al. |
| 5,884,040 A | 3/1999 | Chung |
| 5,886,993 A | 3/1999 | Ruszczyk et al. |
| 5,892,769 A | 4/1999 | Lee |
| 5,896,561 A | 4/1999 | Schrader et al. |
| 5,903,614 A | 5/1999 | Suzuki et al. |
| 5,914,932 A | 6/1999 | Suzuki et al. |
| 5,914,959 A | 6/1999 | Marchetto et al. |
| 5,940,399 A | 8/1999 | Weizman |
| 5,940,438 A | 8/1999 | Poon et al. |
| 5,948,060 A | 9/1999 | Gregg et al. |
| 5,956,338 A | 9/1999 | Ghaibeh |
| 5,966,412 A | 10/1999 | Ramaswamy |
| 5,970,062 A | 10/1999 | Bauchot |
| 5,987,011 A | 11/1999 | Toh |
| 6,005,894 A | 12/1999 | Kumar |
| 6,006,017 A | 12/1999 | Joshi et al. |
| 6,041,063 A | 3/2000 | Povlsen et al. |
| 6,041,358 A | 3/2000 | Huang et al. |
| 6,044,154 A | 3/2000 | Kelly |
| 6,044,482 A | 3/2000 | Wong |
| 6,052,377 A | 4/2000 | Ohmi et al. |
| 6,074,086 A | 6/2000 | Yonge, III |
| 6,076,115 A | 6/2000 | Sambamurthy et al. |
| 6,092,214 A | 7/2000 | Quoc et al. |
| 6,097,703 A | 8/2000 | Larsen et al. |
| 6,098,179 A | 8/2000 | Harter, Jr. |
| 6,108,713 A | 8/2000 | Sambamurthy et al. |
| 6,111,919 A | 8/2000 | Yonge, III |
| 6,125,150 A | 9/2000 | Wesel et al. |
| 6,130,887 A | 10/2000 | Dutta |
| 6,130,894 A | 10/2000 | Ojard et al. |
| 6,151,296 A | 11/2000 | Vijayan et al. |
| 6,169,744 B1 | 1/2001 | Grabelsky et al. |
| 6,182,147 B1 | 1/2001 | Farinacci |
| 6,188,717 B1 | 2/2001 | Kaiser et al. |
| 6,192,397 B1 | 2/2001 | Thompson |
| 6,202,082 B1 | 3/2001 | Tomizawa et al. |
| 6,215,792 B1 | 4/2001 | Abi-Nassif |
| 6,216,244 B1 | 4/2001 | Myers et al. |
| 6,222,851 B1 | 4/2001 | Petry |
| 6,243,386 B1 | 6/2001 | Chan et al. |
| 6,243,449 B1 | 6/2001 | Margulis et al. |
| 6,246,770 B1 | 6/2001 | Stratton et al. |
| 6,252,849 B1 | 6/2001 | Rom et al. |
| 6,259,696 B1 | 7/2001 | Yazaki et al. |
| 6,263,445 B1 | 7/2001 | Blumenau |
| 6,269,132 B1 | 7/2001 | Yonge, III |
| 6,278,685 B1 | 8/2001 | Yonge, III et al. |
| 6,278,716 B1 | 8/2001 | Rubenstein et al. |
| 6,279,716 B1 | 8/2001 | Kayatani et al. |
| 6,289,000 B1 | 9/2001 | Yonge, III |
| 6,295,296 B1 | 9/2001 | Tappan |
| 6,334,185 B1 | 12/2001 | Hansson et al. |
| 6,343,083 B1 | 1/2002 | Mendelson et al. |
| 6,363,052 B1 | 3/2002 | Hosein |
| 6,370,156 B2 | 4/2002 | Spruyt et al. |
| 6,385,672 B1 | 5/2002 | Wang et al. |
| 6,397,368 B1 | 5/2002 | Yonge, III et al. |
| 6,421,725 B1 | 7/2002 | Vermilyea et al. |
| 6,430,192 B1 | 8/2002 | Creedon et al. |
| 6,430,661 B1 | 8/2002 | Larson et al. |
| 6,434,153 B1 | 8/2002 | Yazaki et al. |
| 6,442,129 B1 | 8/2002 | Yonge, III et al. |
| 6,456,649 B1 | 9/2002 | Isaksson et al. |
| 6,466,580 B1 | 10/2002 | Leung |
| 6,469,992 B1 | 10/2002 | Schieder |
| 6,473,435 B1 | 10/2002 | Zhou et al. |
| 6,480,489 B1 | 11/2002 | Muller et al. |
| 6,487,212 B1 | 11/2002 | Erimli et al. |
| 6,501,760 B1 | 12/2002 | Ohba et al. |
| 6,519,263 B1 | 2/2003 | Huth |
| 6,526,451 B2 | 2/2003 | Kasper |
| 6,538,985 B1 | 3/2003 | Petry et al. |
| 6,553,534 B2 | 4/2003 | Yonge, III et al. |
| 6,567,416 B1 | 5/2003 | Chuah |
| 6,567,914 B1 | 5/2003 | Just et al. |
| 6,622,172 B1 | 9/2003 | Tam |
| 6,654,410 B2 | 11/2003 | Tzannes |
| 6,667,991 B1 | 12/2003 | Tzannes |
| 6,671,284 B1 | 12/2003 | Yonge, III et al. |
| 6,747,976 B1 | 6/2004 | Bensaou et al. |
| 6,778,507 B1 | 8/2004 | Jalali |
| 6,907,044 B1 | 6/2005 | Yonge et al. |
| 6,909,723 B1 | 6/2005 | Yonge et al. |
| 7,280,517 B2 | 10/2007 | Benveniste |
| 7,352,770 B1 | 4/2008 | Yonge et al. |
| 7,369,579 B2 | 5/2008 | Logvinov et al. |

| | | | |
|---|---|---|---|
| 7,457,306 B2 | 11/2008 | Watanabe et al. | |
| 7,522,630 B2 | 4/2009 | Ho et al. | |
| 7,551,606 B2 | 6/2009 | Iwamura | |
| 7,558,294 B2 | 7/2009 | Yonge, III et al. | |
| 7,623,542 B2 | 11/2009 | Yonge et al. | |
| 7,715,425 B2 | 5/2010 | Yonge, III et al. | |
| 7,729,372 B2 | 6/2010 | Yonge, III et al. | |
| 7,822,059 B2 | 10/2010 | Katar et al. | |
| 2001/0043576 A1 | 11/2001 | Terry | |
| 2001/0048692 A1 | 12/2001 | Karner | |
| 2002/0012320 A1 | 1/2002 | Ogier et al. | |
| 2002/0027897 A1* | 3/2002 | Moulsley et al. | 370/342 |
| 2002/0042836 A1 | 4/2002 | Mallory | |
| 2002/0048368 A1 | 4/2002 | Gardner | |
| 2002/0061031 A1 | 5/2002 | Sugar et al. | |
| 2002/0065047 A1 | 5/2002 | Moose | |
| 2002/0115458 A1 | 8/2002 | Mizuno et al. | |
| 2002/0137462 A1 | 9/2002 | Rankin | |
| 2002/0191533 A1 | 12/2002 | Chini et al. | |
| 2003/0006883 A1 | 1/2003 | Kim et al. | |
| 2003/0079169 A1 | 4/2003 | Ho et al. | |
| 2003/0174664 A1 | 9/2003 | Benveniste | |
| 2003/0181204 A1 | 9/2003 | Benveniste | |
| 2003/0217182 A1 | 11/2003 | Liu et al. | |
| 2003/0227934 A1* | 12/2003 | White et al. | 370/432 |
| 2004/0001499 A1 | 1/2004 | Patella et al. | |
| 2004/0064509 A1 | 4/2004 | Ayyagari et al. | |
| 2004/0077338 A1* | 4/2004 | Hsu et al. | 455/414.1 |
| 2004/0136396 A1 | 7/2004 | Yonge et al. | |
| 2004/0250159 A1* | 12/2004 | Tober et al. | 714/4 |
| 2005/0114489 A1 | 5/2005 | Yonge, III et al. | |
| 2005/0149649 A1* | 7/2005 | Carneal et al. | 710/36 |
| 2005/0190785 A1 | 9/2005 | Yonge, III et al. | |
| 2005/0192011 A1 | 9/2005 | Hong et al. | |
| 2006/0034247 A1 | 2/2006 | Gu et al. | |
| 2006/0126513 A1 | 6/2006 | Li et al. | |
| 2006/0221879 A1* | 10/2006 | Nakajima et al. | 370/310 |
| 2006/0239213 A1 | 10/2006 | Frederiks et al. | |
| 2007/0025383 A1* | 2/2007 | Katar et al. | 370/442 |
| 2007/0025384 A1 | 2/2007 | Ayyagari et al. | |
| 2007/0025391 A1* | 2/2007 | Yonge et al. | 370/458 |
| 2007/0025398 A1 | 2/2007 | Yonge et al. | |
| 2007/0058659 A1 | 3/2007 | Ayyagari et al. | |
| 2007/0064788 A1 | 3/2007 | Yonge, III | |
| 2007/0091925 A1 | 4/2007 | Miyazaki et al. | |
| 2007/0109973 A1* | 5/2007 | Trachewsky | 370/252 |
| 2007/0127381 A1* | 6/2007 | Oh et al. | 370/235 |
| 2007/0230497 A1 | 10/2007 | Choi et al. | |
| 2007/0248089 A1* | 10/2007 | Redi et al. | 370/392 |
| 2008/0117891 A1* | 5/2008 | Damnjanovic et al. | 370/345 |
| 2009/0116461 A1 | 5/2009 | Yonge et al. | |
| 2009/0154487 A1 | 6/2009 | Ryan et al. | |
| 2009/0207865 A1 | 8/2009 | Yonge et al. | |
| 2010/0111099 A1 | 5/2010 | Yonge et al. | |

FOREIGN PATENT DOCUMENTS

| | | |
|---|---|---|
| EP | 0818905 A2 * | 1/1998 |
| EP | 0818905 A2 * | 1/1998 |
| WO | WO 98/57440 | 12/1998 |
| WO | WO 00/72495 | 11/2000 |
| WO | WO 02/06986 | 1/2002 |
| WO | WO 02/13442 | 2/2002 |
| WO | WO 02/41598 | 5/2002 |
| WO | WO 03/100996 | 12/2003 |
| WO | WO 2004/038980 | 5/2004 |
| WO | WO 2007/014319 | 2/2007 |

OTHER PUBLICATIONS

Bruschi, Danilo, Secure Multicast in Wireless Networks of Mobile Hosts: Protocols and Issues, 2002, Mobile Networks and Applications, pp. 503-511.

Bux, "Token-Ring Local-Area Networks and Their Performance," Procs. of the IEEE, vol. 77, No. 2, Feb. 1989.

Carrier sense multiple access with collision detection (CSMA/CD) access method and physical layer specifications, ISO/IEC 8802-3: 1996 International Standard (ANSI/IEEE Std 802.3).

Dube, P.; Altman, E.; Queueing analysis of early message discard policy; Communications, 2002. ICC 2002. IEEE International Conference, vol. 4, Iss., 2002, pp. 2426-2430.

Ehrsam et al., "A cryptographic key management scheme for implementing the Data Encryption Standard," IBM Syst J, vol. 17, No. 2 (1978).

European Search Report, European Patent Office, European Patent Application No. 06253916.8-1246, Oct. 31, 2006, 8 pages.

Goalic et al., "Real-Time Turbo-Decoding of Product Codes on a Digital Signal Processor," IEEE, pp. 624-628 (1997).

HiPerformance Radio Local Area Network (HiperLAN) Type I: Functional Specification, European Standard (Telecommunication Series) No. 300652 V. 1.2.1 Jul. 1998.

HomePlug Powerline Alliance, HomePlug 1.0.1 Specification, Dec. 1, 2001.

IBM, Combined use of collision resolution and collision avoidance MAC protocols, Oct. 1, 1994, IBM Technical Disclosure Bulletin, vol. 37, pp. 299-302 (NN9410299).

Interface Specification for HomePNA™ 2.0—10M8 Technology, Dec. 1, 1999.

Interface Specification for HomePNA™ 2.0—10M8 Technology—Link Layer Protocols, Dec. 1, 1999.

International Search Report from PCT application No. PCT/US06/29377, dated Sep. 25, 2007, 9 pages.

ISO/IEC 8802-3: 2002 International Standard (ANSI/IEEE Std 802.3) Carrier sense multiple access with collision detection (CSMA/CD) access method and physical layer specifications.

ISO/IEC 8802-11: 1999 International Standard (ANSI/IEEE Std 802.11) Wireless LAN Medium Access Control (MAC) and Physical Layer (PHY) specifications.

Kamerman, A; Aben, G; Net throughput with IEEE 802.11 wireless LANs; Wireless Communications and Networking Conference, 2000. WCNC 2000 IEEE, vol. 2, Sep. 23-28, 2000; pp. 747-752.

Katar et al., "Beacon Schedule Persistence to Mitigate Beacon Loss in HomePlug AV Networks," May 2006, IEEE 1-4244-0113-05/06, pp. 184-188.

Lee et al., "HomePlug 1.0 powerline communication LANs—protocol description and performance results", International Journal of Communication Systems, 2000 vol. 1-6, pp. 1-25.

Peterson et al., "Error-Correcting Codes," The MIT Press (1972).

PKCS #5 v. 20: Password-Based Cryptography Standard, RSA Laboratories, Mar. 25, 1999.

Pyndiah, "Near Optimum Decoding of Product Codes," IEEE, pp. 339-343 (1994).

Pyndiah, "Near-Optimum Decoding of Product Codes: Block Turbo Codes," IEEE Transactions on Communications, vol. 46, No. 8, pp. 1003-1010 (Aug. 1998).

Pyndiah, "Performance of Block Turbo Coded 16-QAM and 64-QAM Modulations," IEEE, pp. 1039-1043 (1995).

Schneier, Bruce. Applied Cryptography, Second Edition: protocols, algorithms, and source code in C, 1996.

Shared Wireless Access Protocol (Cordless Access) Specification, SWAP-CA Revision 1.21, Jan. 27, 1999, by the HomeRF™ Technical Committee.

Sun et al., Public-key ID-based Cryptosystem, 1991, IEEE, pp. 142-144.

HomePlug Power Alliance Inc., "HomePlug AV White Paper," Doc ver. No. HPAVWP-050818, Aug. 2005, pp. 1-11.

Supplementary European Search Report issued in application No. EP03776498, mailed Jan. 28, 2010, 3 pages.

European Search Report, European Patent Office, European Patent Application No. 09176939, Oct. 15, 2010, 6 pages.

Unpublished U.S. Appl. No. 12/645,561, filed Dec. 23, 2009, 37 pages.

Unpublished U.S. Appl. No. 12/645,574, filed Dec. 23, 2009, 33 pages.

Li, Tianji et al., "Investigation of the Block ACK Scheme in Wireless Ad-hoc Networks." Wireless Communications & Mobile Computing—Medium Access Control Protocols for Wireless Ad Hoc Networks, vol. 6, Issue 6, Sep. 2006, pp. 1-13.

Segal, Yossi et al., "OFDM Preamble Sctructure Analysis and Proposal." IEEE 802.16 Broadband Wireless Access Working Group http://ieee802.org/16 Mar. 7, 2011, 6 pages.

European Search Report—EP09176939, Berlin, Jan. 22, 2010.

International Search Report and Written Opinion—PCT/US2008/063226, International Searching Authority, European Patent Office, Oct. 31, 2008.

* cited by examiner

MANAGING DISTRIBUTED ACCESS TO A SHARED MEDIUM

CROSS-REFERENCE TO RELATED APPLICATIONS

This application claims priority to U.S. Application Ser. No. 60/917,232, entitled "MANAGING DISTRIBUTED ACCESS TO A SHARED MEDIUM," filed on May 10, 2007, incorporated herein by reference.

TECHNICAL FIELD

The invention relates to network protocols and more particularly to managing distributed access to a shared medium.

BACKGROUND

Communication stations can share a communication medium using any of a variety of access techniques. Some access techniques (e.g., carrier sense multiple access (CSMA) techniques) include a contention period in which stations determine contend for use of the medium for transmitting a signal by sensing when the medium is idle. In CSMA techniques, "collisions" sometimes occur when signals from two or more stations overlap. Some CSMA techniques attempt to detect collisions and abort transmission to reduce the negative impact of collisions (e.g., CSMA/CD techniques). Other CSMA techniques include mechanisms to avoid or reduce the probability of collisions (e.g., CSMA/CA techniques). For example, different transmissions may be assigned one of multiple priorities. Access is granted using a Priority Resolution Period in which stations signal the priority at which they intend to transmit, and only the highest priority transmissions are allowed to continue in the contention process. A random backoff mechanism spreads the time over which stations attempt to transmit, thereby reducing the probability of collision.

Other access techniques (e.g., time division multiplexing (TDM) techniques) allocate predetermined time intervals in which certain stations are granted use of the medium. A particular station will transmit within a time slot assigned to that station. In these techniques, a synchronization mechanism is used to ensure that the stations agree about when their slot occurs with respect to a common time reference.

SUMMARY

In one aspect, in general, a method for communicating between stations in a network is described. The method includes coordinating among a plurality of the stations according to a distributed protocol to select a first station to transmit over a shared medium. The method also includes transmitting between the first station and a second station over the shared medium during a time period in which stations other than the first and second stations refrain from transmitting over the shared medium. The first station transmits information that grants permission to the second station to transmit during the time period.

Aspects may incorporate one or more of the following features.

Transmitting between the first station and the second station further includes transmitting from the first station information that includes a specified amount of the time period during which the second station is allowed to transmit.

A specified amount of the time period during which the second station is allowed to transmit is predetermined before the time period begins.

The specified amount of the time period is stored in each of the stations.

The specified amount of the time period is stored in a given station when the given station joins the network.

The specified amount of time is determined as a function of a data rate being used by a station.

The method further comprises coordinating among the plurality of stations according to the distributed protocol to select one of the stations to transmit over the shared medium after receiving information over the shared medium from the first station or the second station that indicates that the time period will end.

The first station or the second station transmits the information that indicates that the time period will end in response to receiving a transmission from the second station or the first station.

The information that indicates that the time period will end includes acknowledgement information confirming successful transmission of information from the second station or the first station.

The first station or the second station transmits the information that indicates that the time period will end in response to detecting a potential collision.

Detecting a potential collision comprises receiving a transmission in which at least some data is not correctly received.

Detecting a potential collision comprises not receiving any transmission over the shared medium after a predetermined amount of time.

The first station transmits the information that grants permission after receiving a request from the second station.

The request from the second station is transmitted to the first station after at least one transmission from the first station to the second station during the time period.

The method further comprises providing a plurality of opportunities for the second station to transmit to the first station during at least a portion of the time period.

The time period includes time during which the second station is able to transmit acknowledgement information confirming successful transmission of information from the first station to the second station.

The specified amount of the time period during which the second station has received permission to transmit is larger than the time during which the second station transmits the acknowledgement information.

The first station transmits the information that grants permission after receiving a request from the second station included in the acknowledgement information.

The acknowledgement information includes information designating which of multiple segments of information were successfully received by the second station and which of the multiple segments of information should be retransmitted by the first station.

The method further comprises transmitting from the second station during the time period in response to receiving the information that grants permission.

The method further comprises transmitting from the first station acknowledgement information confirming successful transmission of information from the second station to the first station.

The acknowledgement information includes information designating which of multiple segments of information were successfully received by the first station and which of the multiple segments of information should be retransmitted by the second station.

Information transmitted from the second station within the specified amount of the time period includes information other than acknowledgement information confirming successful transmission of information from the first station to the second station.

The information transmitted from the second station within the specified amount of the time period includes a delimiter that precedes a payload, wherein the payload includes the information other than acknowledgement information.

The delimiter includes acknowledgement information confirming successful transmission of information previously transmitted from the first station to the second station.

The information that grants permission is included in header information of a transmission from the first station to the second station.

The first station transmits the information that grants permission after receiving a transmission from the second station that includes an amount of time that is requested.

Information transmitted from the second station to the first station within the specified amount of the time period comprises information used to maintain data flow from the first station to the second station.

The information transmitted from the second station to the first station within the specified amount of the time period comprises adaptation information used by the first station to prepare a signal to be transmitted to the second station.

The adaptation information comprises a map that designates a type of modulation that is to be used, respectively, on each of multiple carriers in the signal.

Information transmitted from the second station to the first station within the specified amount of the time period comprises information according to a protocol associated with a connection between the first station and the second station.

The protocol comprises transmission control protocol (TCP).

The protocol comprises a voice over internet protocol (VOIP).

Coordinating among the plurality of stations according to the distributed protocol comprises contending according to a carrier sense multiple access (CSMA) protocol.

Coordinating among the plurality of stations according to the distributed protocol comprises selecting a predetermined sequence of time slots to which respective stations are assigned.

The predetermined sequence of time slots repeats periodically.

In another aspect, in general, a system for communicating between stations is described. The system includes a first station configured to coordinate among a plurality of the stations according to a distributed protocol to gain access to transmit over a shared medium, and transmit to a second station over the shared medium during a time period in which stations other than the first and second stations refrain from transmitting over the shared medium, including transmitting information that grants permission to the second station to transmit during the time period. The second station is configured to, in response to receiving the information that grants permission, transmit to the first station over the shared medium during the time period.

In another aspect, in general, a method for communicating between stations in a network is described. The method includes coordinating among a plurality of the stations according to a distributed protocol to select a first station to transmit over a shared medium; transmitting between the first station and a second station over the shared medium during a time period in which stations other than the first and second stations refrain from transmitting over the shared medium; and coordinating among the plurality of stations according to the distributed protocol to select one of the stations to transmit over the shared medium after receiving information over the shared medium from the first station or the second station that indicates that the time period will end.

Aspects can include one or more of the following features.

The method further comprises transmitting from the first station information that grants permission to the second station to transmit during the time period.

The first station or the second station transmits the information that indicates that the time period will end in response to receiving a transmission from the second station or the first station.

The information that indicates that the time period will end includes acknowledgement information confirming successful transmission of information from the second station or the first station.

The first station or the second station transmits the information that indicates that the time period will end in response to detecting a potential collision.

Detecting a potential collision comprises receiving a transmission in which at least some data is not correctly received.

Detecting a potential collision comprises not receiving any transmission over the shared medium after a predetermined amount of time.

The information that indicates that the time period will end includes a payload.

The method further comprises transmitting acknowledgement information confirming successful transmission of the payload in a transmission sent after the time period has ended.

In another aspect, in general, a system for communicating between stations is described. The system includes a first station configured to coordinate among a plurality of the stations according to a distributed protocol to gain access to transmit over a shared medium, and transmit to a second station over the shared medium during a time period in which stations other than the first and second stations refrain from transmitting over the shared medium. The second station is configured to transmit to the first station over the shared medium during the time period. A third station is configured to coordinate among the plurality of stations according to the distributed protocol to gain access to transmit over the shared medium after receiving information over the shared medium from the first station or the second station that indicates that the time period will end.

Among the many advantages of the invention (some of which may be achieved only in some of its various aspects and implementations) are the following.

It enables stations to operate reliably and at higher data rates under various power line environments. It provides a channel adaptation mechanism that can be used in power line communication systems as well as other media that are affected by channel impairments. It can provide a higher level of guaranteed quality of service (QoS). It enables more efficient utilization of contention-free time allocations by enabling a transmitting station to grant some of its allocated time to a receiving station.

The time granted from the allocated time enables a receiving station to send information other than acknowledgement information. For example, time allocated to a first station may include time during which a second receiving station is able to transmit acknowledgement information to the first station confirming successful transmission of information from the first station to the second station. The bi-directional bursting procedure preserves the ability of the receiving station to transmit such acknowledgment information without obtaining specific permission, and provides a way for the receiving station to obtain permission to transmit further information.

At the end of a burst, stations that did not participate in the burst can detect an indicator within a final transmission that signals that the burst is ending and that the stations are able to start contending for access to the medium. This indicator enables the stations to start contending quickly without needing to wait for an inter-frame spacing. This reduces the delay and also avoids the need for sensing circuitry for detecting the lack of a signal during such an inter-frame spacing.

Other features and advantages of the invention will be found in the detailed description, drawings, and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

System Overview

Figure 1:
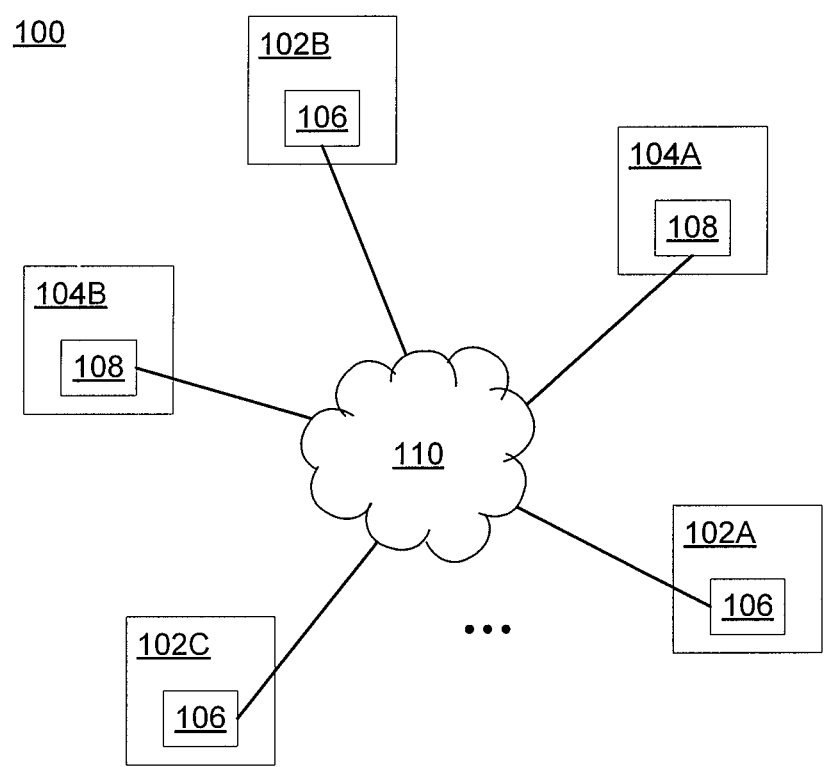
FIG. 1 is a schematic diagram of a network configuration.

As shown in FIG. 1, a network configuration 100 provides a shared communication medium 110 for a number of communication stations (e.g., computing devices, or audiovisual devices) to communicate with each other. The communication medium 110 can include one or more types of physical communication media such as coaxial cable, unshielded twisted pair, or power lines, for example. The network configuration 100 can also includes devices such as bridges or repeaters. The communication stations communicate with each other using predetermined physical (PHY) layer and medium access control (MAC) layer communication protocols. The MAC layer is a sub-layer of the data link layer and provides an interface to the PHY layer, according to the Open Systems Interconnection (OSI) network architecture standard. The network configuration 100 can have any of a variety of network topologies (e.g., bus, tree, star, mesh). The communication stations communicate with one another based on requests from software applications running on the hardware of the respective station.

The stations can have differences in the specific communication protocols used, and are still able to communicate with each other if the protocols are compatible. For example, network configuration 100 includes a first type of communication station including stations 102A, 102B, 102C that use a first MAC layer protocol "MAC-A" with a second type of communication station including stations 104A and 104B that use a second type of MAC layer protocol "MAC-B." The MAC-A and MAC-B protocols are compatible with each other and also use the same or at least compatible PHY layer protocols (e.g., one station uses a MAC-A protocol and a PHY-A protocol, and another station uses a MAC-B protocol and a PHY-B protocol, where PHY-A and PHY-B implement compatible signal modulation formats).

The co-existence of multiple MAC layer protocols can be used, for example, to allow improvements in capabilities and/or performance of the MAC layer while also allowing devices using a new MAC layer protocol to be compatible with legacy devices using an older MAC layer protocol that may exist in the network configuration 100. In some implementations, a dual-mode (DM) device can communicate with a legacy single-mode (SM) device using a first protocol, and can communicate with other DM devices using either the first protocol or a second protocol. The protocol to be used can be set by a communication mode that is determined at network setup time or when a device joins the network. For example, stations 104A and 104B include a network interface module 108 that uses MAC-A. Stations 102A, 102B, and 102C include a network interface module 106 that can use either MAC-A or MAC-B depending on the determined communication mode.

An example of a difference between the protocol layers (or "protocol stack") used by different types of devices (e.g., the DM and SM devices) is the use of a "central coordinator" (CCo) station. The CCo is a communication station that is selected to provide certain coordination functions for at least some of the other stations in the network configuration 100. A set of stations operating under the coordination of a single CCo is called a Basic Service Set (BSS). Functions performed by the CCo include: authentication of stations upon joining the BSS, provisioning of identifiers for stations, and scheduling and timing of medium access. For example, the CCo broadcasts a repeated beacon transmission from which the stations in the BSS can determine scheduling and timing information. This beacon transmission includes fields that carry information used by the stations to coordinate communication. Though the format of each of the repeated beacon transmission is similar, the content typically changes in each transmission. The beacon transmission is repeated approximately periodically, and, in some implementations, is synchronized to a characteristic of the communication medium 110. The time between successive beacon transmissions is called a "beacon period," even though the transmissions may not be exactly periodic. In some cases, a Proxy Coordinator (PCo) can be used to manage stations that are "hidden" from the CCo (e.g., stations that do not reliably receive signals from the CCo). An example of a system in which a CCo is used is described in U.S. application Ser. No. 11/337,963, incorporated herein by reference.

Some protocols are distributed protocols that do not rely on a CCo station to coordinate communication. Instead, the stations coordinate among each other according to a distributed protocol in which one of the stations is selected to transmit over a shared medium during a given time period. An example of such a distributed protocol is Carrier Sense Multiple Access with Collision Avoidance (CSMA/CA). In this distributed protocol, stations use random backoff algorithms to determine how long a station has to wait before it transmits a packet. If the station determines that another station has already started a transmission, the station will wait until the current transmission is complete, after which it uses the backoff algorithm. In general, the backoff parameters can be adjusted in a distributed manner based on the number of times the station deferred or the number of time a station's transmission has collided with transmissions from one or more other stations. This distributed adaptation of back-off parameters can enable the network to work efficiently under various network loads (or varying number of transmitters). Distributed protocols can also be used to reserve repeating TDMA allocations on the medium. One such example is the one described in U.S. application Ser. No. 10/695,371, entitled "Contention Free Access Intervals on a CSMA network," incorporated herein by reference. A principle behind such protocols is to notify neighboring stations about the repeating time intervals during which the station intends to transmit. Once this information is successfully communicated to the neighboring stations, the transmitter will be allocated the repeating TDMA time slot (or "allocation") during which it will be free to transmit. All stations in the network can use this procedure to obtain their own TDMA allocations based on application requirements.

There may also be differences in the access techniques implemented by the MAC-A and MAC-B protocols. For example, in one scenario, the MAC-A protocol uses a first access technique the MAC-B protocol is compatible with the first access technique and provides a second access technique. In this example, the MAC-A protocol uses a CSMA/CA technique to access the network configuration 100. The MAC-B protocol uses a hybrid approach that includes a contention-free period (CFP) in which a time division multiple access (TDMA) technique is used, and optionally includes a contention period (CP) in which a CSMA/CA technique is used. The contention-free period is scheduled and managed by the CCo to provide improved quality of service (QoS) for certain applications run on a device (e.g., audio and/or video applications). Other MAC protocols can use any one or combination of these or other access techniques.

In some implementations, the network interface modules use protocols that include features to improve performance when the network configuration 100 includes a communication medium 110 that exhibits varying transmission characteristics. For example, one aspect of mitigating potential impairments caused by the varying channel characteristics involves using a robust signal modulation format such as orthogonal frequency division multiplexing (OFDM), also known as Discrete Multi Tone (DMT). OFDM is a spread spectrum signal modulation technique in which the available bandwidth is subdivided into a number of narrowband, low data rate channels or "carriers." To obtain high spectral efficiency, the spectra of the carriers are overlapping and orthogonal to each other. Data are transmitted in the form of symbols that have a predetermined duration and encompass some number of carriers. The data transmitted on these carriers can be modulated in amplitude and/or phase, using modulation schemes such as Binary Phase Shift Key (BPSK), Quadrature Phase Shift Key (QPSK), or m-bit Quadrature Amplitude Modulation (m-QAM).

System Architecture

Any of a variety of communication system architectures can be used to implement the portion of the network interface module that converts data to and from a signal waveform that is transmitted over the communication medium. An application running on a station provides and receives data to and from the network interface module in segments. A "MAC Protocol Data Unit" (MPDU) is a segment of information including overhead and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line.

The MPDU can be formatted, for example, as a "frame" that includes a start of frame (SOF) delimiter and (optionally) a payload. In some implementations an end of frame (EOF) delimiter can be used to indicate the end of a frame, but an EOF delimiter is not necessary and is not used in the exemplary implementations illustrated in the figures. The SOF delimiter can include overhead information within fields of a block called "frame control" that is useful for decoding the payload or for responding to another station according to a given protocol, for example. The payload can be various lengths by including some number of blocks to be individually encoded/modulated called PHY Blocks (PBs). In some cases, no payload needs to be sent, but a small amount of information such as acknowledgement information can be sent in a "short MPDU" consisting of just an SOF delimiter without a payload. At the front of a PPDU is a preamble that is used to synchronize a station to the timing of the PPDU. In some cases, the preamble can be considered part of the MPDU, for example, with the SOF delimiter including a preamble and a frame control block.

In OFDM modulation, data are transmitted in the form of OFDM "symbols." Each symbol has a predetermined time duration or symbol time $T_S$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_S$. Equivalently, each carrier frequency is an integral multiple of a frequency interval $\Delta f=1/T_S$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

There can be different types of PPDU structures, for example, depending on whether the PHY-A or PHY-B protocol is being used. For example, the PHY-B signals can use denser OFDM carrier frequency spacing and correspondingly longer symbols.

Figure 2:
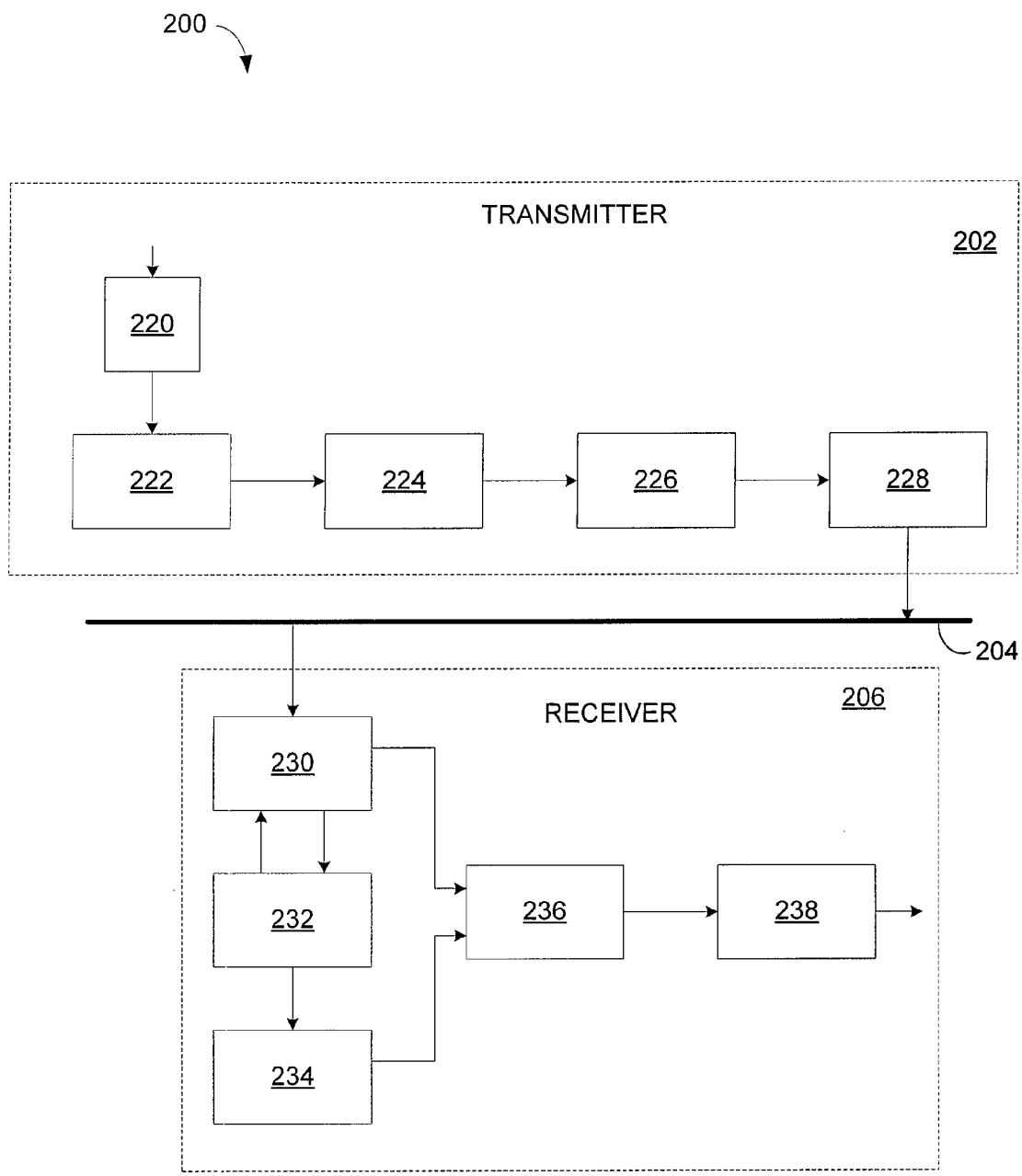
FIG. 2 is a block diagram of a communication system.

Referring to FIG. 2, a communication system 200 includes a transmitter 202 for transmitting a signal (e.g., a sequence of OFDM symbols) over a communication medium 204 to a receiver 206. The transmitter 202 and receiver 206 can both be incorporated into a network interface module at each station. The communication medium 204 can represent a path from one device to another over the power line network.

At the transmitter 202, modules implementing the PHY layer receive an MPDU from the MAC layer. The MPDU is sent to an encoder module 220 to perform processing such as scrambling, error correction coding and interleaving.

The encoded data is fed into a mapping module 222 that takes groups of data bits (e.g., 1, 2, 3, 4, 5, 6, 7, 8, 9, 10, 11 and 12 bits), depending on the constellations used for the various carriers (e.g., a BPSK, QPSK, 8-QAM, 16-QAM constellation), and maps the data value represented by those bits onto the corresponding amplitudes of in-phase (I) and quadrature-phase (Q) components of carrier waveforms of the current symbol. This results in each data value being associated with a corresponding complex number $C_i=A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 222 also determines which of the carrier frequencies $f_1, \ldots, f_N$ within the OFDM bandwidth are used by the system 200 to transmit information. For example, some carriers that are experiencing fades can be avoided, and no information is transmitted on those carriers. Instead, the mapping module 222 uses coherent BPSK modulated with a binary value from the Pseudo Noise (PN) sequence for that carrier. For some carriers (e.g., a carrier i=10) that correspond to restricted bands (e.g., an amateur radio band) on a medium 204 that may radiate power no energy is transmitted on those carriers (e.g., $A_{10}=0$). The mapping module 222 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 224 performs the modulation of the resulting set of N complex numbers (some of which may be zero for unused carriers) determined by the mapping module 222 onto N orthogonal carrier waveforms having peak frequencies $f_1, \ldots, f_N$. The modulated carriers are combined by IDFT module 224 to form a discrete time symbol waveform S(n) (for a sampling rate $f_R$), which can be written as $$S(n) = \sum_{i=1}^{N} A_i \exp[j(2\pi i n/N + \Phi_i)] \quad \text{Eq. (1)}$$

where the time index n goes from 1 to N, Ai is the amplitude and $\Phi_i$ is the phase of the carrier with peak frequency $f_i=(i/N) f_R$, and $j=\sqrt{-1}$. In some implementations, the discrete Fourier transform corresponds to a fast Fourier transform (FFT) in which N is a power of 2.

A post-processing module 226 combines a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. The effect of the transmission of the continuous-time version of the waveform S(t) over the communication medium 204 can be represented by convolution with a function g(τ;t) representing an impulse response of transmission over the communication medium. The communication medium 204 may add noise n(t), which may be random noise and/or narrowband noise emitted by a jammer.

At the receiver 206, modules implementing the PHY layer receive a signal from the communication medium 204 and generate an MPDU for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). Demodulator/Decoder module 238 maps the complex numbers onto the corresponding bit sequences and performs the appropriate decoding of the bits (including deinterleaving and descrambling).

Any of the modules of the communication system 200 including modules in the transmitter 202 or receiver 206 can be implemented in hardware, software, or a combination of hardware and software.

Channel Estimation

Channel estimation is the process of measuring the characteristics of the power line channel to adapt the operation of the PHY layer to provide optimal performance.

Channel estimation can include:
  Selection of the tone map designating modulation method(s) to be used on each carrier. Any given carrier may use different modulations at different times within the beacon period.
  Selection of the FEC rate.
  Selection of the guard interval length.
  Selection of the intervals within the beacon period where a particular tone map, FEC rate, and guard interval setting applies.

The FEC rate and guard interval length can vary over the AC line cycle period, but they are the same for all carriers at any given time.

The results of channel estimation can be reported to the CCo in centralized protocols for use in allocating time slots in the CFP. The CCo can allocate time for communication between a transmitting and receiving station to perform channel estimation. The CCo can then use this channel estimation information in determining or updating the schedule of time slots allocated to stations in the CFP. In distributed protocols, the results of channel estimation can be used by stations as they coordinate communication including setting up time periods during which unidirectional or bidirectional communication can occur between a pair of stations.

The channel-estimation procedures may differ slightly between the CP and the CFP. In the CP, the receiving station can designate a default tone map that may be used by the transmitting station anywhere in the CP. The receiving station may optionally define additional Tone maps that may be used in the CP during particular intervals of the beacon period. This approach allows the transmitting station to begin communicating using tone map modulated data quickly, and avoids complicated interactions between the CSMA access procedure and the channel-estimation procedures for the CP. This approach is well suited to the transport of best effort data. Alternatively, the receiving station can designate intervals within a beacon period over which particular channel adaptation applies without taking into account whether a transmission is within the CP or the CFP.

Before data communication occurs in the CFP, the receiving station defines a tone map that is valid in the interval of the beacon period where the transmission is scheduled. If no valid tone map is defined in an interval, the transmitting station sends a "SOUND MPDU" in the interval until the receiving station defines a tone map that for the interval in a "Sounding process." The SOUND MPDU includes a signal known to the receiving station from which the receiving station can estimate characteristics of the channel.

An MPDU that carries data is called a "data MPDU." To acknowledge that the PBs within a data MPDU have been successfully received the receiving station sends to the transmitting station a selective acknowledgement (SACK) message. The SACK designates which of the PBs were successfully received (e.g., using check sequence) and which of the PBs should be retransmitted. For a SOUND MPDU, a "Sound ACK" is used to indicate the reception status and completion of the Sounding process. In some cases, the SACK and Sound ACK messages can be sent as information within one or more fields of the frame control of a short MPDU.

The receiving station defines a tone map in which the modulation for a carrier is tailored to the characteristics of the channel at that carrier frequency. In addition to channel characteristics, the receiving station can also define a tone map based on a type of data to be transmitted (e.g., more robust modulation for applications more sensitive to data loss). The tone map is sent to the transmitting station in a channel estimation response (CER) message.

Alternatively, if no valid tone map is defined in an interval, the transmitting station can use a default tone map that has enough redundancy to be successfully transmitted assuming worst case channel characteristics. This default tone map may be more appropriate if the transmitting station only has a relatively small amount of data to send.

The channel-estimation procedures also include mechanisms for maintaining the lists of the intervals within the beacon period where each tone map may be used. Tone map intervals are defined as time periods within the beacon period where a particular tone map may be used. Since the CCo locks the beacon period to the AC line cycle, intervals are synchronized to the AC line cycle.

Channel and noise characteristics over the power line tend to be periodic with the underlying AC line cycle. In some cases, these impairments occur at twice the frequency of the AC line cycle (i.e., 100 or 120 Hz), while in other cases they may occur at the same frequency as the AC line cycle (e.g., a noise source that responds to the polarity of the AC line waveform). Because of the different access mechanisms and QoS requirements, intervals occurring in the CP and CFP may be treated differently.

The receiving station specifies the intervals within which various tone maps may be used, subject to certain guidelines which may include any of the following:
  The CP default tone map may be used anywhere in the contention period.
  With the exception of default tone map, intervals are disjoint (non-overlapping).
  The transmitter may not transmit PPDUs with the PPDU Payload crossing the boundary between intervals using different tone maps.
  The receiver specifies intervals that are large enough to carry a complete PPDU, based on the indicated tone map.
  The current intervals definition is carried in the CER message.
  The current intervals definition becomes stale if a period of 30 seconds has elapsed since the last CER message was received from the receiving station.

Bursting

Bursting is a process in which a station transmits multiple MPDUs in a burst (without relinquishing the medium) before soliciting a response (e.g., a SACK). For example, when a burst of data MPDUs is transmitted, the SACK transmitted at the end of the burst contains the reception status of all the PBs in each of the MPDUs in the burst. When a burst of Sound MPDUs is transmitted, the Sound ACK that is transmitted at the end of the burst will indicate the reception status of the Sound MPDUs. Since bursts can be acknowledged by one response (after time spent waiting for response and the subsequent interframe spacing) for a group of MPDUs, they provide higher MAC efficiency. Significant improvement in the performance can be obtained for high data rate streams, such as High Definition Television (HDTV) and Standard Definition Television (SDTV) streams, by using bursting. Receivers are configured to recognize bursts and wait to send acknowledgements until after the burst has ended.

Figure 3:
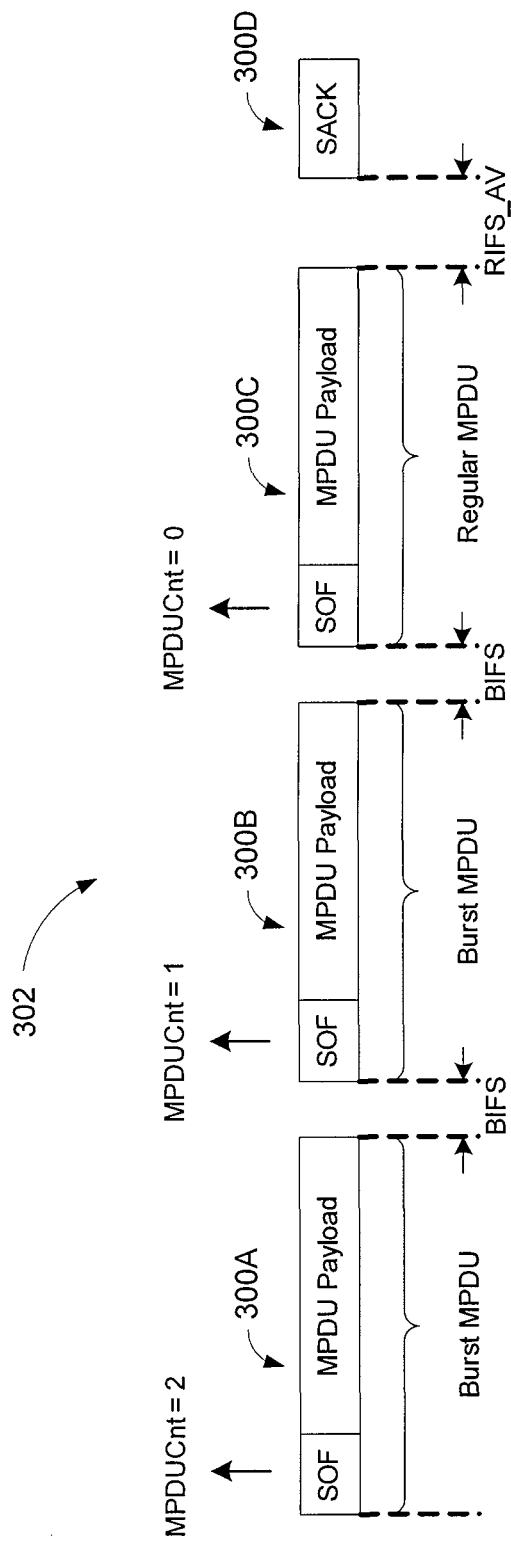
FIG. 3 is a timing diagram of an example of bursting.

FIG. 3 shows an example of bursting with three data MPDUs 300A, 300B, 300C in a burst 302. The MPDUCnt field in the SOF delimiter of the first MPDU 300A in the burst 302 indicates the number of MPDUs that follow the first MPDU in the burst. Following MPDUs include decremented MPDUCnt values that indicate the remaining number of MPDUs. In this example, the first MPDU 300A, second MPDU 300B, and third MPDU 300C include MPDUCnt values of 2, 1, and 0, respectively, in the SOF delimiters of the MPDUs. The burst of three data MPDUs ends with transmission of a SACK MPDU 300D, which carries PB reception information for each of the MPDUs 300A, 300B, 300C.

MPDUs are categorized as "regular MPDUs" or "burst MPDUs," depending on whether a response is expected at the end of their transmission. MPDUs that are followed by a response are referred to as regular MPDUs and are indicated by setting the MPDUCnt in their delimiter to a predetermined value (e.g., 0). The last MPDU in a burst and MPDUs in non-burst transmissions belong to this category. MPDUs that are followed by one or more long MPDUs are referred to as burst MPDUs. In this case, MPDUCnt indicates the number of MPDUs to follow.

When a Data MPDU with a non-zero MPDUCnt field is received by a destination, the receiver refrains from generating a response and stores the corresponding SACK information locally. This process continues until the last MPDU in the burst (indicated by MPDUCnt=0) is received. Upon the reception of the last MPDU, the receiver aggregates the stored SACK information and transmits it in a single SACK MPDU. The SACK fields contain the reception status of each of the PBs in each of the MPDUs. If the transmitter fails to receive a SACK at the end of an MPDU Burst, it may send a SOF delimiter with Request SACK Retransmission (RSR) set to 1. This will cause the receiver to transmit (or retransmit) the SACK information.

When a Sound MPDU with a non-zero MPDUCnt field is received by the destination, the receiver refrains from generating a Sound ACK and waits for the subsequent Sound MPDU. This process continues until the last MPDU in the burst (indicated by MPDUCnt=0) is received. Upon reception of the last MPDU, the receiver responds with a Sound ACK. In contrast to SACK, Sound ACK indicates the proper reception of the last Sound MPDU in the Burst and does not necessarily carry an indication on the reception status of other Sound MPDUs in the burst.

During the CP, the maximum duration of a MPDU Burst, including the response time and the subsequent Contention Interframe Spacing is short enough to fit within the CP.

The burst MPDUs can include a predetermined minimum number of OFDM Symbols (e.g., at least two OFDM Symbols) for transmitting the MPDU Payload. This minimum number of OFDM Symbols can ensure that the receiver has sufficient time to interpret the frame control and start searching for the next MPDU in the burst.

In some implementations, the stations support a "bidirectional burst" procedure. This procedure allows a transmitting station to allocate part of its time to the receiving station, so the receiving station can send data to the transmitting station (i.e., over the reverse channel). This procedure can be used to send reverse traffic associated with applications that require 2-way exchange of information between stations. For example, Transmission Control protocol (TCP) based applications have application data going in one direction and TCP Acknowledgments coming in the reverse direction. In such cases, the bidirectional bursting procedure can be used to send TCP acknowledgements in the reverse channel. Applications such as Voice over Internet Protocol (VoIP), Video conferencing, etc., can also take advantage of bidirectional bursting procedure. This procedure may also be used for exchange of network management information, for example, to send an updated tone map to a transmitting station in response to a change in the channel characteristics as determined by the receiving station. In general, the bidirectional busting procedure can be used in any scenario where there is traffic flowing between a pair of station in both directions.

The receiving station initiates the bidirectional burst procedure using fields in a SACK message transmitted during the receiving station's allocated time interval for sending a SACK message. The fields in the frame control indicate the presence of the request (e.g., in a Request Reverse Transmission Flag (RRTF)) and the number of blocks that the receiving station wants to send (e.g., in a Request Reverse Transmission Length (RRTL) field). The receiving station can also indicate the type of data to be sent.

Upon receiving the request, the transmitting station decides whether the request will be granted and, in some implementations, the duration of the granted time. The transmitting station signals that the request is allowed by sending grant information including any relevant information such as, for example, the maximum amount of data that may be transmitted in the reverse direction. The transmitting station can grant the request by setting a Bidirectional Burst Flag (BBF) in the SOF delimiter, and can indicate the duration in a Maximum Reverse Transmission Frame Length (MRTFL) field in the SOF delimiter.

In some implementations, the transmitting station does not need to send the duration of the time granted because the duration may be predetermined before the request. For example, for example, the granted time may be a default amount of time (e.g., 1 ms). The receiver would simply request a reverse transmission without needing to indicate a number of blocks requested. The default amount of time can be pre-stored in each of the stations, or the default amount of time can be negotiated when a station joins a network. In some cases the default amount of time can be determined as a function of various parameters of one or more stations. For example, the default amount of time can be a function of data rate being used by a station. A higher data rate can be assigned a smaller amount of time since more data can be sent in a given time period at a higher data rate. In some implementations, the transmitter can initiate granting a reverse transmission without receiving a request from the receiver. For example, the transmitter may already know that the receiver will need time for reverse transmissions due to characteristics of a higher layer protocol.

Figure 4:
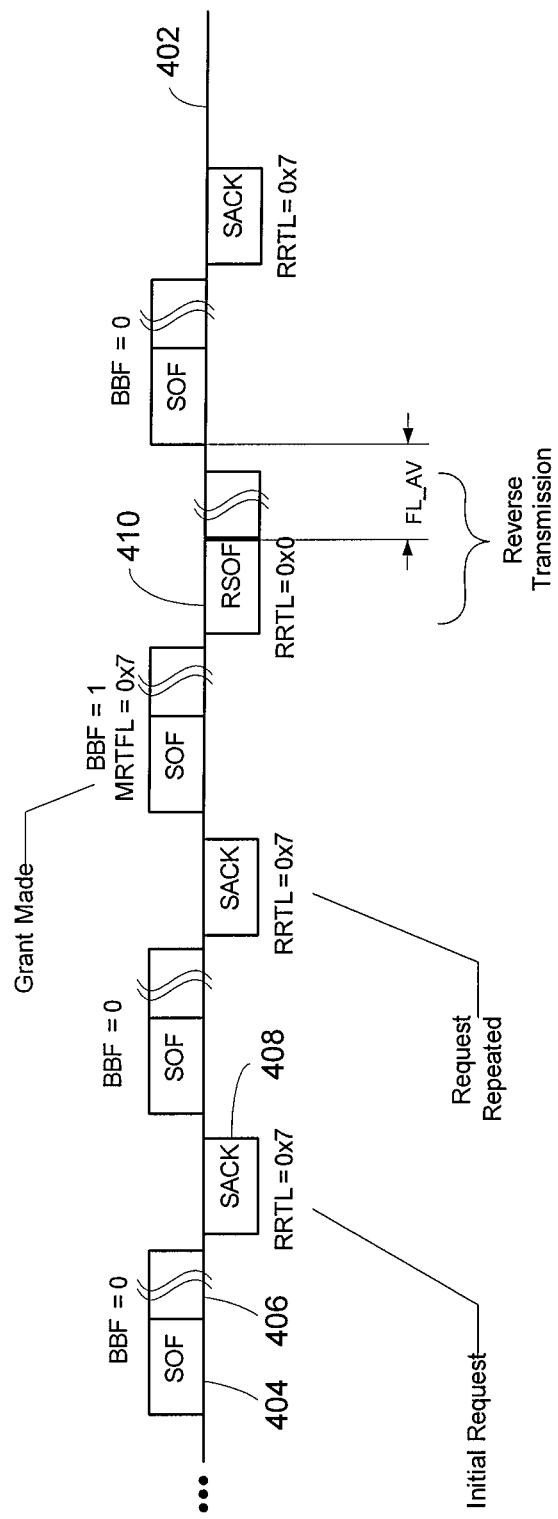
FIGS. 4, 5, 6A, 6B and 7 are timing diagrams of examples of bidirectional bursting.

FIG. 4 shows an exemplary timing diagram for the bidirectional burst procedure. Transmissions in a "forward" direction from station A to station B are shown on the top of a timeline 402, and transmissions in a "reverse" direction from station B to station A are shown in the bottom of the timeline 402. Initially, station A has been allocated time to transmit information to station B (e.g., after contending for access to the medium). The bidirectional burst starts with a transmission from station A to station B. The transmissions from station A to station B include MPDUs with a SOF delimiter 404 and a payload 406. Initially, station B is allocated time to respond with a SACK transmission 408 for each MPDU (or burst of MPDUs) but not time to send additional information in the reverse direction back to station A. When station B determines that it has information to send in the reverse direction, it sets the RRTF and RRTL fields in the SACK transmission. These fields are set until station A responds with a grant for reverse transmission (e.g., by setting the BBF flag to 1 and indicating the maximum duration of reverse transmission in the MRTFL field) or until there is no longer a need to request a transmission in the reverse direction. Additionally, to reduce overhead, when station B is going to send an MPDU (or burst of MPDUs) that includes a payload 406 in the reverse direction, station B can combine the SACK that would otherwise have been sent with the SOF of the transmission in a Reverse SOF (RSOF) 410 that includes the SACK information within the frame control of the RSOF 410.

In some implementations of the bidirectional burst procedure, there are restrictions on the bursting of multiple data MPDUs before soliciting a SACK response. For example, in some implementations bursting can be used in the forward direction, but not in the reverse direction. In this case, bidirectional communication is still allowed, but bursting only occurs in the forward direction.

Figure 5:
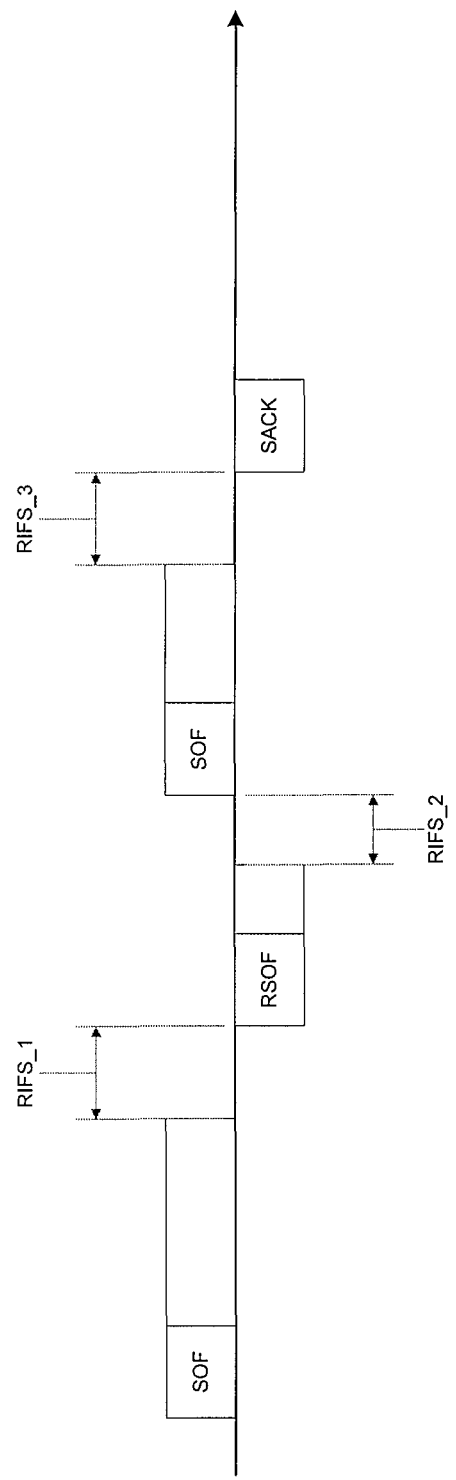

Sufficient interframe spaces are maintained between various MPDUs exchanged during bidirectional bursting to account for the processing latencies and propagation latencies. FIG. 5 shows the various interframe spaces for bidirectional bursting. A minimum interframe space of RIFS_1 is present between the end of a forward MPDU and the start of subsequent reverse MPDU. A minimum interframe space of RIFS_2 is present between the end of a reverse MPDU and the start of a subsequent forward MPDU. An interframe spacing of RIFS_3 is present between the end of a forward MPDU and the start of the corresponding reverse SACK MPDU. The values for RIFS_1, RIFS_2 and RIFS_3 can be fixed values or can vary based on implementation. For example, the transmitter and receiver can negotiate the values for these interframe spaces before the bidirectional bursting procedure is used.

In some implementations, the bidirectional burst procedure depends on whether the burst is occurring in a CP, or a CFP. Bidirectional bursts in a CP end with a SACK or other indication that the bidirectional burst will end (e.g., after the end of that final SACK or after the end of a final payload of a final RSOF with payload). The SACK can be sent in either the "forward" or "reverse" direction (by either the original transmitter or original receiver, respectively), as described in more detail below. Bidirectional bursts in a CFP may end with transmission of a SACK (in either direction) or transmission of a Reverse SOF and payload (the use of this option can be communicated during connection setup). When a bidirectional burst in a CFP ends with a Reverse SOF and payload, a minimum interframe space of RIFS_AV is present between the end of Reverse SOF payload and the end of the CFP. The support for CFP bidirectional bursts ending with Reverse SOF and payload enables stations to improve the efficiency of VoIP and other low data rate applications.

The unidirectional bursting and bidirectional bursting protocols can be used in a CFP or a CP of protocols that are centralized via a CCo or protocols that are distributed without the need for a CCo. In centralized protocols, the channel access is controlled by a single station (e.g., the CCo). The CCo provides dedicated channel access intervals to various stations. The CCo may also provide shared allocations to stations. During these shared allocations, multiple stations can transmit. For example, stations may use a distributed protocol like CSMA during the shared allocation. Examples of centralized protocols include polling protocols and beacon based TDMA channel access protocols. Channel access in distributed protocols is managed by coordination between various stations in the network, without the need for a single station acting as a master. An example of distributed protocols includes networks operating using contention based channel access protocol like CSMA as the basic channel access mechanism. Distributed protocols can also support contention free allocations. For example, station can negotiate contention free allocations with other station in the network, thus enabling the station to have access during contention free intervals.

Unidirectional or bidirectional bursting operating over distributed protocols take into account the possibility of collisions. For example, a burst can be prematurely terminated when a collision is suspected (e.g., either directly detected, or inferred due to lack of communication for a predetermined amount of time).

Unidirectional or bidirectional bursting over distributed protocols provide sufficient information to other stations in the network (i.e., stations other than the two stations participating in the burst) to enable them to determine the end of the burst and when they can start contending for access to the medium. In a technique used by some other protocols, the other stations would determine that they can start contending for access to the medium by detecting a terminal inter-frame spacing of a certain length. If no signals are detected for a given amount of time, the stations would determine that they could start contending. Such a terminal inter-frame spacing would need to be larger than the inter-frame spacing used between transmissions in a burst. In the technique used in the unidirectional and bidirectional bursting protocols described herein, the stations are able to detect the SACK transmission (in either direction) and anticipate that they will be able to start contending immediately (or within a short terminal inter-frame spacing) after the end of the final transmission. Any unique indicator within a final transmission (e.g., a SACK or a Reverse SOF and payload) by either the transmitter or receiver stations can signal that the burst is ending and that the other stations are able to start contending for access to the medium. In some cases, a terminal inter-frame spacing can be much shorter than the inter-frame spacing within a burst due to processing latencies that may be required between transmissions in the burst.

Additional restrictions like providing an upper bound on the duration of bidirectional bursting can be applied to ensure fairness among various stations in the network.

Figure 6A:
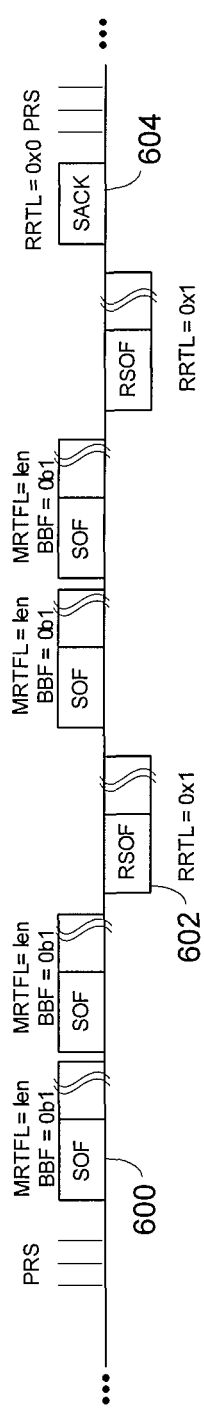

FIG. 6A shows an example of bidirectional bursting during a CP (e.g., a during a CSMA period within a beacon period, or during CSMA communication without a CCo station sending beacon transmissions). When station A gains access to the channel (after contending with other stations), it can set the BBF field in the SOF delimiter 600 to 1 to indicate that the channel will not be relinquished after the first transmission of a burst of frames from station A. Station B, indicates to the other stations, by sending a Reverse SOF 602, that they cannot access the channel following that transmitted frame from station B. Station A can follow the receipt of RSOF 602 with the transmission of another frame or burst of frames. The transmission of a SACK (or other predetermined indicator) by either station A or station B is used to indicate the end of the bidirectional burst. In this example, station A ends the bidirectional burst with a SACK 604.

Figure 6B:
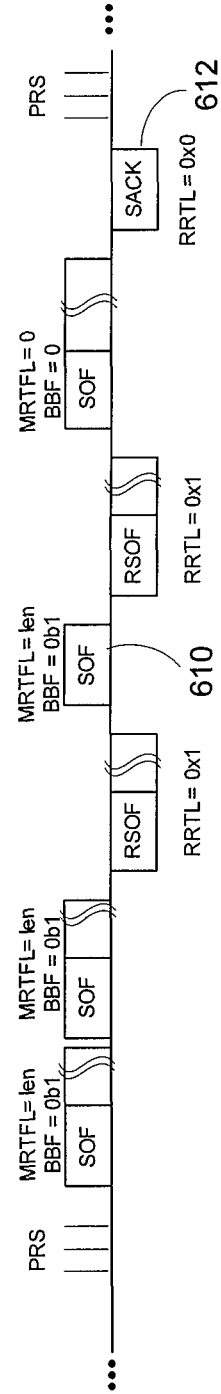

In another example shown in FIG. 6B, if after sending a reverse transmission station B continues to request a reverse transmission (as indicated by the RRTF and RRTL fields) and station A has no data to send, station A may continue the burst by sending a short frame 610 with a SOF delimiter with the BBF field set to 1 but no payload. Similarly, if station A has granted time for a reverse transmission and station B does not have any data to transmit, station B can continue the burst by sending a short frame with a RSOF delimiter but no payload. The sequence of bidirectional bursts can be terminated with either station A or station B transmitting a SACK. In this example, station B ends the bidirectional burst with a SACK 612.

In some examples, station A may also instruct station B to terminate the bidirectional burst by setting the BBF field to 0 in the SOF delimiter. Station B would then terminate the bidirectional burst by sending a SACK. If either station suspects a potential collision (e.g., if some or all received PBs are not correctly received), it can terminate the bidirectional burst with a SACK. Likewise, if no frame control is received after a predetermined amount of time, the sending station can assume a collision has occurred and terminate the bidirectional burst with a SACK.

During a bidirectional burst, listening stations (i.e., stations not participating in the bidirectional burst) defer to the two stations participating in the bidirectional burst until the end of the burst (e.g., indicated by a SACK). Upon receiving a SOF with MPDUCnt set to 0 and BBF set to 0, the third-party stations would infer that the bidirectional burst is ending and they would start priority contention at the end of the expected SACK transmission. If they receive an SOF with MPDUCnt set to 0 and BBF set to 1, they would start looking for a reverse transmission. If they receive a RSOF, they would continue to look for a SOF. If they receive a SACK at any time, they are allowed to start priority contention immediately after the SACK.

The bidirectional burst procedure during CSMA can be subject to additional restrictions. For example, the total duration of the bidirectional burst, including the final SACK and subsequent Contention Interframe Spacing (CIFS_AV), can be limited to not exceed a predetermined maximum time period (e.g., 5000 μsec). This maximum time period may be determined to fit within a CSMA period within a beacon period, for example.

Figure 7:
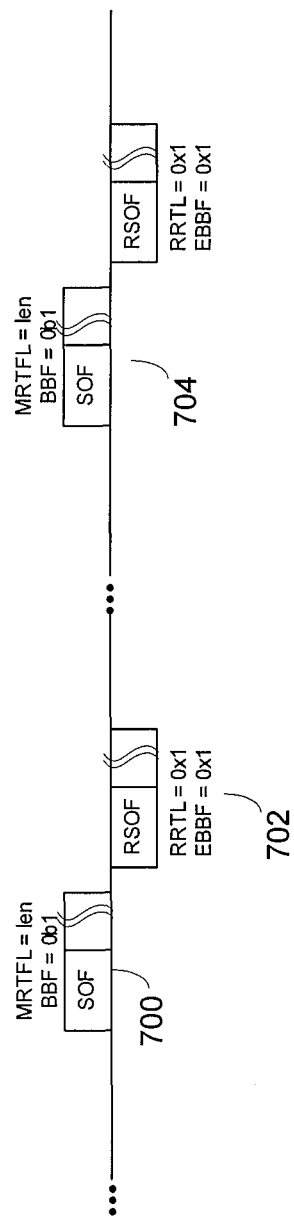

FIG. 7 shows another example of bidirectional bursting. When station A gains access to the channel, it can set the BBF field in the SOF delimiter 700 to 1 to indicate that the channel will not be relinquished after the first transmission of a frame from station A. Following the transmission from station A, station B sends a Reverse SOF 702. The Reverse SOF includes acknowledgement for frame received from station A as well as data from station B to station A. Further, station B indicates in its Reverse SOF 702 that the burst transmission will end by setting the End of Bidirectional Burst Flag (EBBF) to 1. The acknowledgement for the Reverse SOF 702 is communicated by station A in its subsequent SOF transmission 704. This example illustrates a mechanism by which bidirectional bursting can be ended by the second station by communicating this information in the Reverse SOF. This enables to bidirectional bursts to be more efficient. Application like Voice over IP (VoIP) that require very low data rate can use this mechanism to reduce overhead.

Many other implementations of the invention other than those described above are within the invention, which is defined by the following claims. For example, the bidirectional bursting can also used in environments where the transmitter gets access to the medium using other channel access techniques.

What is claimed is:

1. A method for communicating between stations in a network, the method comprising:

coordinating among a plurality of the stations according to a distributed protocol and based on a contention period to select a first station to transmit over a shared medium; and transmitting between the first station and a second station over the shared medium during a first time period, wherein the first station is allocated the first time period for transmitting over the shared medium in response to contending with others of the plurality of stations during the contention period, in which stations other than the first and second stations refrain from transmitting over the shared medium, including transmitting from the first station information that grants permission to the second station to transmit for a specified amount of time during the first time period and transmitting information that indicates the specified amount of time to the second station, wherein the first station transmits the information that grants permission after receiving a transmission from the second station that includes an amount of time that is requested, and wherein a second time period, non-overlapping with the first time period, is allocated to the second station.

2. The method of claim 1, further comprising, before transmitting between the first station and the second station during the first time period, transmitting from the first station information that includes the specified amount of time during the first time period during which the second station is allowed to transmit.

3. The method of claim 1, wherein the specified amount of time during the first time period stored at the first and second stations before the first time period begins is stored in each of the plurality of stations.

4. The method of claim 3, wherein the specified amount of time during the first time period is stored in a given station when the given station joins the network.

5. The method of claim 1, wherein the specified amount of time during the first time period is determined as a function of a data rate being used by the second station.

6. The method of claim 1, further comprising coordinating among the plurality of stations according to the distributed protocol to select one of the stations to transmit over the shared medium after receiving information over the shared medium from the first station or the second station that indicates that the first time period has ended.

7. The method of claim 6, wherein the first station or the second station transmits the information that indicates that the first time period has ended in response to receiving a transmission from the second station or the first station.

8. The method of claim 7, wherein the information that indicates that the first time period has ended includes acknowledgement information confirming successful transmission of information from the second station or the first station.

9. The method of claim 6, wherein the first station or the second station transmits the information that indicates that the first time period has ended in response to detecting a potential collision.

10. The method of claim 9, wherein detecting a potential collision comprises receiving a transmission in which at least some data is not correctly received.

11. The method of claim 9, wherein detecting a potential collision comprises not receiving any transmission over the shared medium after a predetermined amount of time.

12. The method of claim 1, wherein the first station transmits the information that grants permission after receiving a request from the second station.

13. The method of claim 12, wherein the request from the second station is transmitted to the first station after at least one transmission from the first station to the second station during the first time period.

14. The method of claim 1, further comprising providing a plurality of opportunities for the second station to transmit to the first station during at least a portion of the first time period.

15. The method of claim 1, wherein the first time period includes time during which the second station is able to transmit acknowledgement information confirming successful transmission of information from the first station to the second station.

16. The method of claim 15, wherein the specified amount of time during the first time period during which the second station has received permission to transmit is larger than the time during which the second station transmits the acknowledgement information.

17. The method of claim 15, wherein the first station transmits the information that grants permission after receiving a request from the second station included in the acknowledgement information.

18. The method of claim 15, wherein the acknowledgement information includes information designating which of multiple segments of information were successfully received by the second station and which of the multiple segments of information should be retransmitted by the first station.

19. The method of claim 1, further comprising transmitting from the second station during the first time period in response to receiving the information that grants permission.

20. The method of claim 19, further comprising transmitting from the first station acknowledgement information confirming successful transmission of information from the second station to the first station.

21. The method of claim 20, wherein the acknowledgement information includes information designating which of multiple segments of information were successfully received by the first station and which of the multiple segments of information should be retransmitted by the second station.

22. The method of claim 1, wherein information transmitted from the second station within the specified amount of time during the first time period includes information other than acknowledgement information confirming successful transmission of information from the first station to the second station.

23. The method of claim 22, wherein the information transmitted from the second station within the specified amount of time during the first time period includes a delimiter that precedes a payload, wherein the payload includes the information other than acknowledgement information.

24. The method of claim 23, wherein the delimiter includes acknowledgement information confirming successful transmission of information previously transmitted from the first station to the second station.

25. The method of claim 1, wherein the information that grants permission is included in header information of a transmission from the first station to the second station.

26. The method of claim 1, wherein information transmitted from the second station to the first station within the specified amount of time during the first time period comprises information used to maintain data flow from the first station to the second station.

27. The method of claim 26, wherein the information transmitted from the second station to the first station within the specified amount of time during the first time period comprises adaptation information used by the first station to prepare a signal to be transmitted to the second station.

28. The method of claim 27, wherein the adaptation information comprises a map that designates a type of modulation that is to be used, respectively, on each of multiple carriers in the signal.

29. The method of claim 1, wherein information transmitted from the second station to the first station within the specified amount of time during the first time period comprises information according to a protocol associated with a connection between the first station and the second station.

30. The method of claim 29, wherein the protocol comprises transmission control protocol (TCP).

31. The method of claim 29, wherein the protocol comprises a voice over internet protocol (VOIP).

32. The method of claim 1, wherein coordinating among the plurality of stations according to the distributed protocol comprises contending according to a carrier sense multiple access (CSMA) protocol.

33. The method of claim 1, wherein coordinating among the plurality of stations according to the distributed protocol comprises selecting a predetermined sequence of time slots to which respective stations are assigned.

34. The method of claim 33, wherein the predetermined sequence of time slots repeats periodically.

35. A system for communicating between stations, the system comprising:
a first station configured to
coordinate among a plurality of the stations according to a distributed protocol and based on a contention period to gain access to transmit over a shared medium; and
transmit to a second station over the shared medium during a first time period, wherein the first station is allocated in response to contending with others of the plurality of stations during the contention period, in which stations other than the first and second stations refrain from transmitting over the shared medium, including transmitting information that grants permission to the second station to transmit for a specified amount of time during the first time period and to transmit information that indicates the specified amount of time to the second station, wherein the first station is configured to transmit the information that grants permission after receiving a transmission from the second station that includes an amount of time that is requested; and
the second station configured to, in response to receiving the information that grants permission, transmit to the first station over the shared medium during specified amount of time during the first time period, and configured to gain access to a second time period, non-overlapping with the first time period, allocated to the second station.

36. A system for communicating between stations, the system comprising:
a first station configured to
coordinate among a plurality of the stations according to a distributed protocol and based on a contention period to gain access to transmit over a shared medium; and
transmit to a second station over the shared medium during a first time period, wherein the first station is allocated in response to contending with others of the plurality of stations during the contention period, in which stations other than the first and second stations refrain from transmitting over the shared medium;
the second station configured to transmit to the first station over the shared medium during the first time period in response to receiving from the first station information that grants permission to the second station to transmit for the specified amount of time during the first time period and to transmit information that indicates the specified amount of time to the second station, wherein the first station transmits the information that grants permission after receiving a transmission from the second station that includes an amount of time that is requested, and configured to gain access to a second time period, non-overlapping with the first time period, allocated to the second station; and
a third station configured to coordinate among the plurality of stations according to the distributed protocol to gain access to transmit over the shared medium after receiving information over the shared medium from the first station or the second station that indicates that the first time period has ended.

37. The method of claim 17 wherein the request from the second station includes a measure of an amount of data to transmit.

38. The method of claim 17 wherein the request from the second station includes an indication of a type of data to transmit.

39. The method of claim 1, wherein the specified amount of time stored at the first and second stations before the first time period begins is negotiated when the first station or the second station joins the network.

40. The system of claim 35 wherein the first station is further configured to transmit information that includes the specified amount of time during the first time period during which the second station is allowed to transmit.

41. The system of claim 35, wherein each of the plurality of stations stores the specified amount of time stored at the first and second stations.

42. The system of claim 35, wherein the specified amount of time during the first time period is determined as a function of a data rate being used by the second station.

43. The system of claim 35, wherein the first station or the second station transmits the information that indicates that the first time period has ended in response to receiving a transmission from the second station or the first station.

44. The system of claim 35, wherein the first station or the second station transmits the information that indicates that the first time period has ended in response to detecting a potential collision.

45. The system of claim 35, wherein the first station is further configured to coordinate among the plurality of stations according to the distributed protocol by selecting a predetermined sequence of time slots to which respective stations are assigned.

46. The system of claim 35, wherein the first station is configured to coordinate among the plurality of stations by contending according to a carrier sense multiple access (CSMA) protocol.

47. The method of claim 1, further comprising, in response to allocation of the first time period for transmitting over the shared medium based on the contention period,
setting by the first station a value in a frame to be transmitted to the second station,
wherein the value indicates that the shared medium will not be relinquished after a first transmission of a burst of frames from the first station to the second station; and
transmitting the frame over the shared medium to the second station.

48. The method of claim 47, further comprising:
transmitting, by at least one of the first station and the second station, a predetermined indicator over the shared medium, wherein the predetermined indicator to indicate an end of a bidirectional burst of frames.

49. The method of claim 48, further comprising:
in response to receiving, by the others of the plurality of stations, the predetermined indicator, initiating a new contention period for selection of a station among the plurality of stations to transmit over the shared medium during the second time period.

50. The system of claim 35, wherein the first station is configured to, in response to allocation of the first time period for transmitting over the shared medium based on the contention period, set a value in a frame to be transmitted to the second station, wherein the value indicates that the shared medium will not be relinquished after a first transmission of a burst of frames from the first station to the second station; and transmit the frame over the shared medium to the second station.

51. The system of claim 50, wherein at least one of the first station and the second station is configured to transmit a predetermined indicator over the shared medium, wherein the predetermined indicator to indicate an end of a bidirectional burst of frames.

52. The system of claim 51, wherein the others of the plurality of stations, in response to receipt of the predetermined indicator, are configured to initiate a new contention period for selection of a station among the plurality of stations to transmit over the shared medium during the second time period.

53. The system of claim 36, wherein the first station is configured to, in response to allocation of the first time period for transmitting over the shared medium based on the contention period, set a value in a frame to be transmitted to the second station, wherein the value indicates that the shared medium will not be relinquished after a first transmission of a burst of frames from the first station to the second station; and transmit the frame over the shared medium to the second station.

54. The system of claim 53, wherein at least one of the first station and the second station is configured to transmit a predetermined indicator over the shared medium, wherein the predetermined indicator to indicate an end of a bidirectional burst of frames.

55. The system of claim 54, wherein the others of the plurality of stations, in response to receipt of the predetermined indicator, are configured to initiate a new contention period for selection of a station among the plurality of stations to transmit over the shared medium during the second time period.

* * * * *